United States Patent
Dunn

[11] Patent Number: 5,086,800
[45] Date of Patent: Feb. 11, 1992

[54] MULTI-TANK LIQUID VARIABLE CONTAINER STORAGE SYSTEM

[76] Inventor: Wallace Dunn, 3520 Cinnamon Pl., Springfield, Mo. 65809

[21] Appl. No.: 663,477

[22] Filed: Mar. 4, 1991

[51] Int. Cl.$^5$ .............................................. E05B 7/07
[52] U.S. Cl. ...................................... 137/1; 137/563; 137/571; 222/94; 222/105
[58] Field of Search ................. 222/94, 105, 106, 107; 137/563, 899, 899.4, 1

[56] References Cited

U.S. PATENT DOCUMENTS

| | | | |
|---|---|---|---|
| 3,393,835 | 7/1968 | Kantor et al. | 222/105 |
| 3,687,050 | 8/1972 | Wilke | 222/94 |
| 3,811,462 | 8/1974 | Feliz | 137/899 |
| 4,570,827 | 2/1986 | Roggenburg, Jr. | 222/105 |
| 4,922,943 | 5/1990 | Gill | 137/563 |

Primary Examiner—A. Michael Chambers
Attorney, Agent, or Firm—Paul M. Denk

[57] ABSTRACT

A liquid storage system involving a variable container concept for storing fresh water and grey water produced by the use of the fresh water is provided. Obviously, other liquids can be handled by this system, either in a recreational vehicle, tank trailer, or dispenser applications. The system includes a hard sided tank containing at least two soft-sided tanks therein. The first soft-sided tank contains fresh water and is connected to the faucet of a sink of a recreational vehicle or the like. The second soft-sided tank is connected to the sink's drain so that it may receive and hold grey water produced from the use of the fresh water. With the fresh liquid tank initially filled and the grey liquid tank initially empty, the system provides for storage of both fresh and grey liquid in the space required for storage of the initial volume of the fresh liquid. In addition, the storage system, as stated, can be used in a tank trailer, or in dispenser applications, for holding at least a pair of fresh liquids, chemicals, or juices, or the like, for independent dispensing. Or, the tank trailer may be filled to capacity in one soft-sided tank, with a first liquid, and as the first liquid is removed, the second soft-sided tank can be filled to capacity with another liquid, for subsequent transport.

5 Claims, 2 Drawing Sheets

MULTI-TANK LIQUID VARIABLE CONTAINER STORAGE SYSTEM

BACKGROUND OF THE INVENTION

This invention relates to the storage of liquid, and, in particular, to the storage of a fresh liquid and of the grey liquid or waste liquid produced from the use of the fresh liquid.

Recreational vehicles such as campers, boats, buses, planes, etc. almost all carry their own supply of fresh water or other liquid and thus must also store the grey liquid that results from the use of the fresh liquid. Presently, separate hard tanks are used for the storage of both fresh and grey water. This requires storage space equal to twice the volume of the amount of water desired to be carried. In other words, if forty gallons of water are needed, there must be storage space for forty gallons of fresh water and forty gallons of grey water, requiring a total of eighty gallons of storage space, of which half will always be empty.

Other systems have been provided in which a single tank is transformed into two tanks by the inclusion of a bladder within the tank or separation of the tank into two areas by a membrane. These systems may result in cross-contamination when a leak occurs in either the membrane or the bladder.

Examples of identified and known prior art include the U.S. Pat. to Stevens, No. 2,758,747, which discloses a multiple compartment tank, patented back in 1956, which includes a liquid-tight tank that has suitable valves, such that when one valve is filled, it fills the tank shell itself, with whatever liquid or material is being deposited therein. On the other hand, as can be seen, the flexible bag-like member retained within the tank and exposed to the two valves can be filled separately, either to capacity, or partially, so that the compartment tank can be filled with two liquids simultaneously, one within the tank proper itself, and the other within its bag-like member.

The U.S. Pat. to Stiefel, No. 3,172,556, shows another form of multi-material storage and transport tank. This particular patent readily discloses a container shaped from two halves, and held together by a securing flange. It states that the flexible diaphragm is apparently located within the partition wall, and is capable of moving laterally of the securing flange, to define a pair of expansible compartments. It discloses how a flexible partition or diaphragm locates within the container. Obviously, the concept of this invention is to provide for filling of the two separate sides of the container, with two discrete materials, as may be desired.

The U.S. Pat. to Kuster, No. 3,197,071, discloses another form of multi-compartment dispenser. In this particular instance, the pair of compartments, each of which apparently are fabricated from some type of polyethylene bag or pouch material, are designed for holding and enclosing two separate liquids that can be discharged from the multi-compartment dispenser as shown.

The U.S. Pat. to Newton, No. 3,467,269, shows a compartmented glass bottle, which has a plurality of compartments therein, each of which are formed of transparent or translucent plastic liner bags, and which mount to and through the neck of the bottle itself.

The U.S. Pat. to Willsey, No. 3,727,795, discloses a vehicle liquid tank transport with flexible partition. This particular invention is quite pertinent to some of the earlier concept of using a diaphragm type of invention in the tank trailer or trucking industry. As can be seen, the invention shown therein includes a pair of semi-circular sections for a tank, and which includes a durable flexible partition, arranged therebetween, so as to provide for filling of separate liquids, such as lubricating oil, to either side of the partition affording individual conveyance of two separate liquids by the tank as disclosed.

The U.S. Pat. to Stephenson, No. 3,902,624, shows the usage of an inflatable bag within a gas pressure vessel, and which bag can be changed in volume, in order to absorb the volumetric changes in the gas sealed within the vessel, and which may subject to shipment and/or storage.

The U.S. Pat. to Kersten, No. 3,918,604, shows another form of convertible compartment container. It is designed to provide for a combination cargo compartment for both liquid and granular materials. The granular materials are loaded into the shown hatch, while the liquid is apparently loaded through a pipe. A type of pliable connecting member is arranged along the partition section which generally is maintained along one side of the container, and can shift inwardly, as when liquid is filled into its section, with the liquid moving the partition laterally, towards the center of the container to provide for partitioning between the two materials being conveyed.

The U.S. Pat. to Hering, No. 3,943,873, shows a cargo/ballast separation device, which in this case, the dual membrane system is utilized for this purpose. It would appear that this particular device may actually hold three separate liquids, one comprised of an oil, with perhaps another oil in the further chamber, and with water being located in yet another chamber. As can be seen, the cargo tank is segregated by means of the flexible membranes, and this particular device is apparently more for use in a cargo ship, which is structured between its bulkhead sections, to function as a conveyor, but separated by the various pairs of flexible membrane members, to allow for the discrete conveyance of various types of oil, water, and other materials as noted.

The U.S. Pat. to Capdevielle, No. 4,091,952, shows a tank structure for the storage and distribution of several fluids, and in this particular instance, hydrocarbons. As can be readily seen, the particular invention utilizes the concept of a multiple configuration, by including a large variety of bags, apparently in combination with some type spring means, in order to prevent obstruction to the intake pipes, where the fluids attain entrance.

The U.S. Pat. to Aho, No. 4,130,198, shows another type of multi-part liquid container. Apparently the concept of this invention is to provide a container for two separate fluids, but of the type that needs to be mixed just prior to usage, and which can be obtained through the manipulation of the container cover, and more specifically, its plastic insert securing means as noted. Once the materials are intermixed, and the two liquids come together, a release mechanism frees the end of the inner bag, allowing its contained liquid to flow into the generalized compartment holding the other liquid within the container.

The U.S. Pat. to Parsons, No. 4,174,741, shows another type of method of loading and unloading liquid from a railroad tank car. It also defines the usage of a flexible diaphragm, as can be readily seen, and generally relates to the method of loading an enclosed container by proceeding through various steps, including emptying, sealing, venting, and filling, for the specific configured railroad tank car as shown.

The U.S. Pat. to Usui, No. 4,453,645, shows another form of an adjustable multi-compartmented container. Once again, the embodiment of this invention appears for application within the railroad car industry. But, it also includes a flexible partition between compartments, and which even provides for a third central compartment, as noted.

Finally, the U.S. Pat. to Landau, No. 4,632,244, shows a multiple chamber flexible container, which in this particular instance appears to be applicable within collapsible tubes, such as the type for use for holding polymer glues, and the like.

In view of the foregoing background, the affectiveness of this current invention, and the structure of its various embodiments, can be more readily understood, as providing an advancement in the art of utilizing a variable container that includes multi-flexible tanks, of the soft-sided type, for furnishing various segments of storage of either fresh or waste materials, or two separate materials available for dispensing.

SUMMARY OF THE INVENTION

One object of the present invention is to provide a fresh water and grey water storage system which occupies only the space needed to store the initial volume of liquid.

Another object of the present invention is to provide such a system in which the possibility of cross-contamination is reduced or eliminated.

A further object of this invention is to provide means for initially storing, in preparation for usage, any of a variety of liquids, or the like, within an initial soft-sided tank, arranged within a hard sided container, wherein a second soft-sided tank is readily available for reception of same or different waste or other type liquid during the processing of the first said contained liquid.

Another object of this invention is to provide a system containing various soft-sided tanks, and which may contain various liquids for dispensing, of a discrete nature, such as two or more different types of fruit juices, or other beverages, readily available in variable quantities for dispensing from a singular hard sided container.

Other objects will be obvious to those skilled in the art in light of the following disclosure and accompanying drawings.

The concept of this invention can best be summarized by indicating and disclosing the various fields of usage of the subject matter of this invention, as outlined herein.

Initially, the first and major application for this invention is in the field of recreational vehicles, wherein the system embodying the hard-sided container will incorporate a pair of soft-sided tanks therein, one of the soft-sided tanks containing fresh water for usage and application by the occupants of the vehicle, and as the water is consumed, the excess or refuge will flow by gravity into the second soft-sided tank, to collect the waste water, for eventual discharge. The recreational vehicle may comprise a trailer, boat, or the like.

Secondly, the concept of this invention may be embodied within a tank trailer, wherein the main embodiment of the trailer may comprise the equivalency of a hard-sided tank, and then incorporate a pair of the soft-sided tanks of this invention therein, wherein the soft-sided tanks may have a variety of applications and uses. For example, two different liquids may be embodied within the soft-sided tanks, for transport and shipment. In the alternative, a singular tank may be filled with a fluid for transport to one location, and delivered, and then a second fluid may be loaded into the second soft-sided tank, unadulterated by any of the type of fluid contained within the first soft-sided tank, to be redelivered back to its source, or to another location. Thus, two liquids will have been transported through usage of this invention, free of any contamination, providing for transport of these two fluids to the complete capacity of the tank trailer's full load.

Thirdly, the concept of this invention may be embodied within a designed dispenser. For example, the concept of this invention may be used within a fruit juice dispenser, of the type as normally found within a restaurant, wherein, two different types of juices may be embodied within the dispenser, one each within one of the soft-sided tanks of this embodiment, in order that, by way of example, the single dispenser formed of one hard-sided container, may dispense orange juice, and grape juice, arranged in adjacency, within the two soft-sided tanks of this development.

In accordance with the objects, generally stated, there is provided a system for storing fresh liquid and waste liquid created from the use of said fresh liquid. The system comprises a hard sided tank of a desired volume containing a first soft side tank for holding fresh liquid and a second soft-sided tank for holding waste liquid, both of which have a capacity equal to said desired volume. The first soft-sided tank communicates with an inlet of a use station and said second soft sided tank communicates with an outlet of said use station, whereby when said first soft-sided tank is initially filled to capacity and said second tank is initially empty, as said fresh liquid is used at said use station, the waste liquid created from the use of said fresh liquid at said use station is fed into said initially empty second soft-sided tank.

Each soft-sided tank includes an inlet and outlet. The inlet of the first soft-sided tank is removably coupled to a source of fresh liquid to charge said system. Its outlet communicates with an inlet of said use station where said fresh liquid is used. The inlet of the second soft-sided tank is connected to an outlet of said use station. Its outlet comprises means for draining said second tank.

The hard-sided tank comprises a top and a bottom, being separate, and both of which have closed upper and lower surfaces, respectively, but are arranged fully opened at their midpoint. Each of the top and the bottom have an integral lip or flange extending at least along two of their opposite sides, such that when the top and the bottom of the tank are brought together, and the lips joined, the tank may be formed into a singular constructed hard-sided container, for holding the soft-sided tanks of this invention. Each of the top and the bottom formed tanks have openings at their ends, for accommodating the various fresh water or fluid flow lines, or hoses, that charge the system, and for accommodating the various drains, as required. Each soft-sided tank includes flexible flange means extending along opposite sides of each soft-sided tank which are received between the lips of the top and bottom to prevent entanglement of said soft-sided tanks.

The hard-sided tank includes spaced apart posts which receive ring means fixed to the soft sided tanks.

The posts and ring means also provide means for preventing entanglement of said soft-sided tanks.

BRIEF DESCRIPTION OF THE FIGURES

FIG. 7 is a perspective view of a soft sided tank for use with the system of FIG. 1; and.

DESCRIPTION OF THE PREFERRED EMBODIMENT

Figure 1:
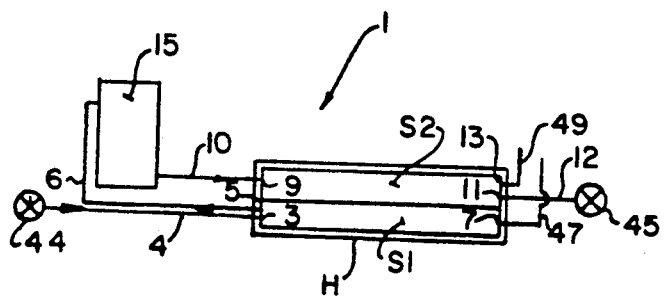
FIG. 1 is a schematic of the liquid storage system of the present invention.

Referring to the figures, reference numeral 1 generally indicates a fresh liquid/waste liquid storage system including a hard tank H containing two soft-sided tanks S1 and S2. Tanks S1 and S2 may share a common wall, but are preferably two distinct soft tanks or bladders. This reduces the possibility of cross-contamination even should one of the soft tanks or bladders develop a leak. Tanks H, S1, and S2 all have the same capacity, such as, for example, forty gallons, which is a common size for recreational vehicles. Planes, buses, or other commercial vehicles may have much larger capacities.

Tanks S1 and S2 each have three ports. See FIG. 1. Tank S1 includes an inlet port 3, an outlet port 5, and an air vent 7. Tank S2 includes an inlet 9, a drain or outlet 11, and an air vent 13. The inlet 3 of tank S1 is removably coupled to a source of fresh water by a hose 4 to allow for charging of system with fresh water. Its outlet 5 is connected by a hose 6 to the faucet of a sink 15 or other type of station which uses water, for example a shower, dishwasher, etc. A pump is generally provided in the sinks of recreational vehicles to force the water from the tank to the faucet. The inlet 9 of tank S2 is connected to the drain of sink 15 by a hose 10 and outlet or drain 11 provides for emptying of the tank S2 through a hose 12. Air vents 7 and 13 are provided to eliminate air in tank S1 and S2, thereby allowing for complete filling and emptying of the tanks.

Storage system 1 is generally positioned below sink 15. Thus, the water is pumped out of tank S1, and tank S2 is filled under the force of gravity. However, system 1 can be positioned above sink 15, in which case, tank S2 will empty under the force of gravity and the pump will be used to fill tank S2.

Figure 8:
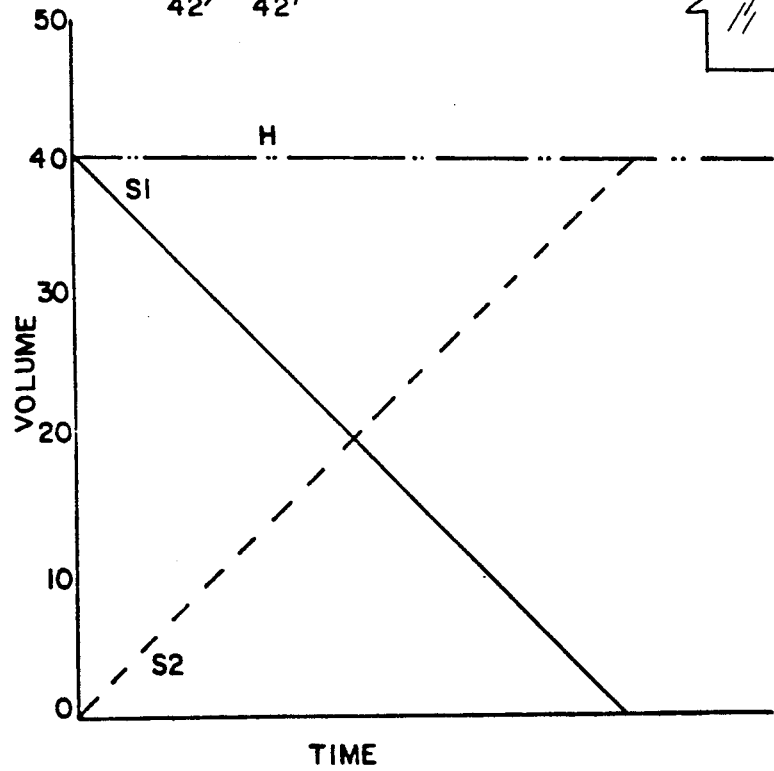
FIG. 8 is a graph displaying the concept of the system.

As shown graphically in FIG. 8, when tank S1 is filled to capacity with fresh water, the total volume of the water in tank H is 40 gallons. As the water is used, as at sink 15, tank S1 will begin to empty, and tank S2 will begin to fill with grey water previously delivered to the basin from tank S1. Throughout the process, the total volume of water (fresh and grey water combined) stays constant at 40 gallons, assuming all water from tank S1 may become grey water. Thus, as tank S1 empties it makes room in tank H for the filling of tank S2 and only the space needed to store 40 gallons of liquid (5.35 cubic feet) is required, rather than the 80 gallons as will be needed if tanks S1 and S2 were rigid tanks.

Tank H is preferably an elongated rectangle having the dimensions of about 22"×44"×8", more or less, for a total of approximately 37 gallons. The dimensions are only illustrative of the preferred embodiment. A rectangular tank H was chosen because it is inexpensive to produce and easy to position within a recreational vehicle. However, tank H may take any shape desired.

Figure 2:
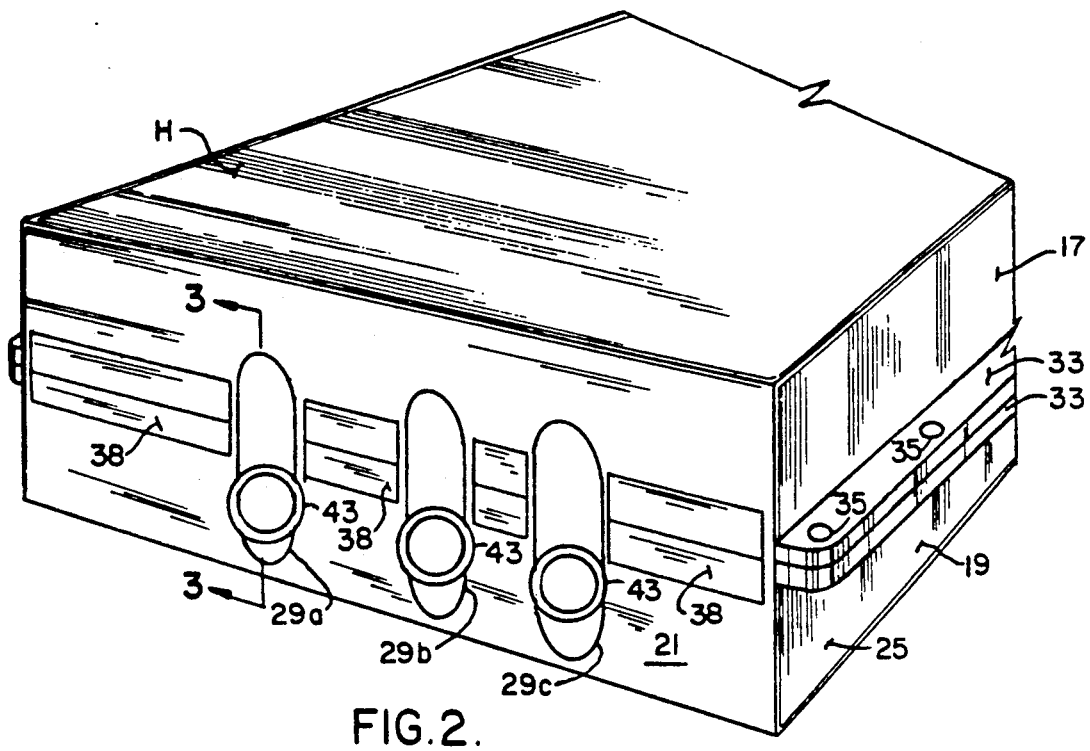
FIG. 2 is an enlarged front perspective view of a hard sided tank for use with the system of FIG. 1.
Figure 4:
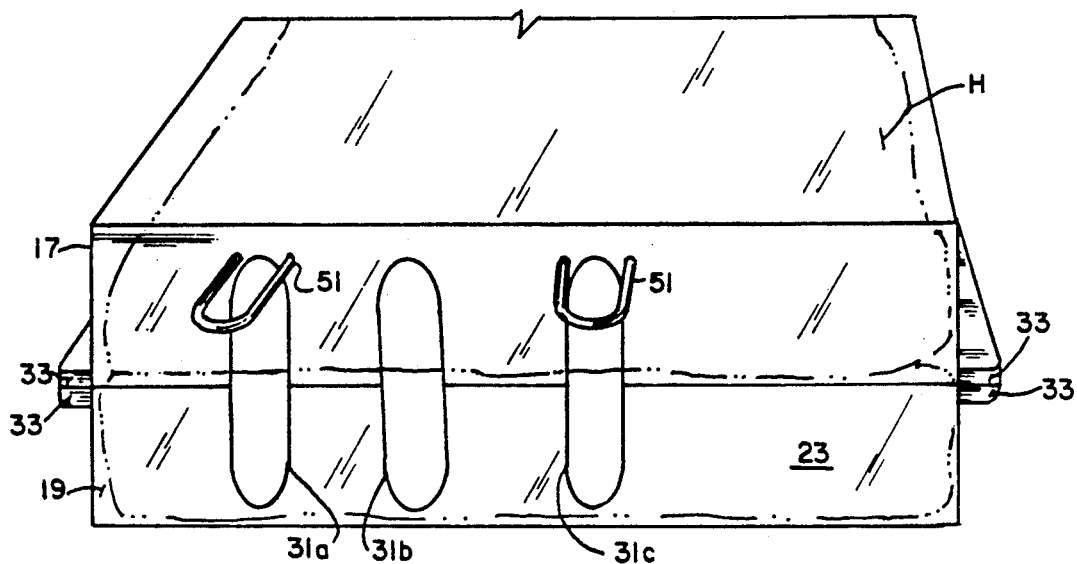
FIG. 4 is an enlarged perspective view of the rear of the hard sided tank.

Tank H, as can be seen in FIGS. 2 and 4, comprises a top 17 and a bottom 19 which are identical. Therefore, only bottom 19 will be described. Bottom 19 comprises a front wall 21, a back wall 23, elongate side walls 25, and a bottom 27 to form an open box. Three slots 29a, b, c are formed in the front wall 21 and three slots 31a, b, c are formed in the back wall 23 to allow for the hoses 4, 6, 10 and 12 to be connected to the various ports of tanks S1 and S2 within tank H. An outwardly directed flange 33 having a plurality of bolt holes 35 therein extends along the top of each side wall 25.

Figure 6:
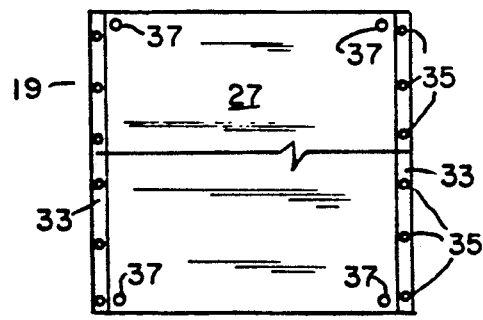
FIG. 6 is a top plan view of a bottom portion of the hard sided tank.

Bottom 19 further includes a narrow cylindrical post 37 at each corner thereof. See FIG. 6. Posts 37 may be twice the height of walls 21 to 23 so that the posts will be one contiguous piece when tank H is put together. Alternatively, post 37 could be fixed in the corners of both top 17 and bottom 19 to be joined when tank H is assembled.

Bottom 19 also has positioning tabs 38 formed in the top of the front and back walls, 21 and 23, to facilitate positioning of tank top 17 on tank bottom 19 when tank H is assembled. Top 17 does not have such tabs.

Tanks S1 and S2 are of identical construction, each having a capacity of approximately forty gallons. Tanks S1 and S2 are formed of two sheets of 20 mil vinyl in a rectangular shape so that they will fit within tank H. Tanks S1 and S2 may be formed in the same manner as are waterbeds. If tank H is not rectangular in shape, tanks S1 and S2 are preferably formed in the same general shape and internal configuration as tank H so they will compatibly fit therein. Soft sided tanks S1 and S2 each include eyelets 39 at their corners, which cooperate with positioning posts 37, and flexible flanges 41 along their elongate sides. See FIG. 7. Each soft-sided tank has ports 42 at their inlets and outlets which receive hoses 4, 6, 10, 12, and the air vents. Preferably one port is centered on the front of the tank and the other two ports are positioned at the back of the tank. Ports 42 and 44 are aligned with slots 29a–c and 31a–c.

Figure 7:
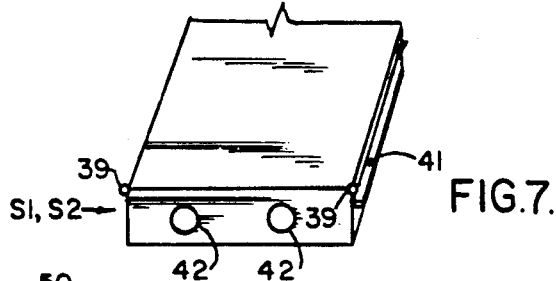
Figure 5:
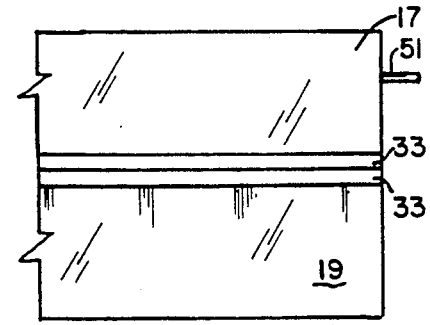
FIG. 5 is a side elevational view of the hard sided tank.

In constructing system 1, and as can be seen in FIG. 7, tanks S1 and S2 are placed within hard tank bottom 19. Eyelets 39 are slidably received on positioning posts 37 and flexible flanges 41 overlay bottom flange 33. The top and bottom are then securely connected by a plurality of screws which are received in bolt holes 35. As can be appreciated, in this configuration, the eyelets in conjunction with the positioning posts, and the flanges, either separately or together, prevent entanglement and folding of the tanks S1 and S2 within tank H.

Figure 3:
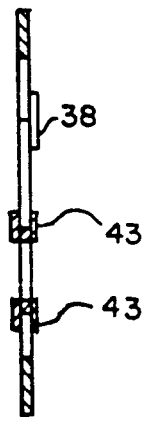
FIG. 3 is a cross-sectional view taken along line 3—3 of FIG. 2.

Tank S2 is preferably placed on top of tank S1 so that it will not be filled under the pressure of tank S2. However, if tank S2 were placed beneath tank S1, a pump could be provided in the conduit leading from the drain of sink 15 to tank S2 to overcome the pressure of tank S1. The hoses, which are connected to the ports of tanks S1 and S2, are fitted through collars 43 which slide in slots 29 and 31 to aid in preventing entanglement of the hoses and tanks within hard tank H. See also FIG. 3. Hard tank top 17 is then placed over hard tank bottom 19 so that flexible flanges 41 are sandwiched between flanges 33 of the top and bottom.

The outlet of fresh water tank S1 is connected to a pump (not shown), which is commonly associated with sinks of recreational vehicles, by hose 6 so that the fresh water in tank S1 will be drawn up into the faucet of the sink. The inlet of grey water tank S2 is then connected to the drain of sink 15 by hose 10 so that grey water will be fed to a tank S2 under the force of gravity. A pump may be placed in conduit 10 if system 1 is located above sink 15. Tank S1 inlet 3 and tank S2 outlet or drain 11 are fitted with valves 44 and 45 to close off the inlet and outlet when system 1 is not being charged or drained. Ports 42 of air vents 7 and 13 have conduits 47 and 49 connected thereto. The open ends of conduits 47 and 49 are held above the level of the tanks by rings 51 to prevent water from escaping through the vents.

As reviewed herein, the configuration of the soft-sided tanks as maintained within the hard container conceivably can utilize the interior surface of the container for effectively providing for dispensing of the fresh liquid. For example, as fresh liquid may be pumped or dispensed from the soft-sided tank, to another location for usage and application, as the waste liquid is dispensed back into the second soft-sided tank, as that tank fills, and biases against the hard interior surface of the container, it will have a tendency to force and build up pressure for dispensing further of the fresh liquid from the first said soft-sided tank.

The invention has been described in connection with water tanks for recreational vehicles. However, it can be seen that the present invention has wider applicability. It can be used wherever two or more tanks are required for different liquids. For example, it may be used in trailer tanks or railroad tank cars where the tank is needed to deliver one liquid and to transport back a different liquid. This will eliminate the tank making a return trip empty. As for example, it will also have applicability in restaurant drink dispenser systems wherein some drink escapes down a drain of the dispenser and can be collected in the waste soft sided tank. It may also be used in camp grounds where a supply of fresh water is needed, but grey water is produced from the fresh as through showers, washing, etc. Furthermore, the soft-sided tanks could conceivably be located side-to-side within the hard container and function to attain some attributes of this invention. All of these various uses have previously been summarized herein.

Variations or modifications to the subject matter of this invention may occur to those skilled in the art upon reviewing the description of the preferred embodiment made herein. Such variations or changes, if within the spirit of this invention, are intended to be encompassed within the scope of any claims to patent protection issuing this development. The description of the preferred embodiment herein is done so for illustrative purposes only.

Having thus described the invention, what is claimed and desired to be secured by Letters Patent is:

1. A system for storing and transporting liquids comprising a hard-sided tank of a desired volume containing a first soft-sided tank for holding one liquid, and second soft-sided tank for holding a second liquid, said first and second soft-sided tanks both having a capacity equal to said desired volume, wherein said first soft-sided tank communicates with an inlet for injecting a liquid into said first soft-sided tank, whereby said liquid may be transported to a distant loction for dispensing, and said second soft-sided tank having an inlet for injecting a second liquid therein for transport to a distant location for dispensing, both said first and second soft-sided tanks having outlets to accommodate their separate dispensing, whereby said first soft-sided tank is initially filled to some capacity, transported, and unloaded, when said second soft-sided tank is then filled to some capacity, as with another and different liquid, with the two liquids capable of being independently dispensed at separate locations after transport.

2. The invention of claim 1 wherein the first soft-sided tank is filled with a first liquid for transfer from an initial location and to a distant location, and then unloaded, and wherein said second soft-sided tank at the distant location is filled to capacity, and then transported back to the initial location for unloading.

3. A system for storing fresh liquid and waste liquid created from the use of said fresh liquid comprising a hard-sided tank of a desired volume containing a first soft-sided tank for holding fresh liquid and a second soft-sided tank for holding a waste liquid, said first and second soft-sided tanks both having a capacity approximately equal to said desired volume, wherein said first soft-sided tank communicates with an inlet of a use station and said second soft-sided tank communicates with an outlet of said use station, wherein said first soft-sided tank is initially filled to capacity, and said second soft-sided tank is initially empty, as said fresh liquid is used at said use station, the waste liquid created from the use of said fresh liquid at said use station is fed into said initially empty second soft-sided tank for collection, each said soft-sided tank including an inlet and outlet, said first soft-sided tank being removably coupled to a source of fresh liquid to charge to said system, said first soft-sided tank outlet communicating with an inlet of said use station where said fresh liquid is used, said second soft-sided tank inlet being connected to an outlet of said use station, and second soft-sided tank outlet being means for draining said second tank, said hard-sided tank comprising a top component and bottom component, said top and bottom components each having a closed end and opening at their midpoints, and a lip extending along two opposite sides of the tank component's midpoint, each said soft-sided tank including flexible flange means extending along opposite sides of each said soft-sided tank, said flange means being received between said hard-sided tank's component lips in order to prevent entanglement of said soft-sided tanks during their application.

4. The system of claim 3 wherein said hard-sided tank includes spaced apart posts, said soft-sided tanks each including ring means which engage said posts, said posts and ring means providing means for preventing entanglement of said soft-sided tanks.

5. The invention of claim 3 and wherein said hard-sided tank contains a series of slots provided therethrough, one of the inlets and outlets of the soft-sided tanks extending through one of said slots, and a collar surrounding each of said extending inlets and outlets and located within a slot to facilitate their shifting during the filling and emptying of said soft-sided tanks.

* * * * *